United States Patent
Ross et al.

(10) Patent No.: US 9,152,862 B2
(45) Date of Patent: Oct. 6, 2015

(54) OBJECT IDENTIFICATION AND INVENTORY MANAGEMENT

(75) Inventors: David Justin Ross, Redmond, WA (US); Brian J. Elmenhurst, Redmond, WA (US)

(73) Assignee: RAF Technology, Inc., Redmond, WA (US)

( * ) Notice: Subject to any disclaimer, the term of this patent is extended or adjusted under 35 U.S.C. 154(b) by 0 days.

(21) Appl. No.: 13/618,362

(22) Filed: Sep. 14, 2012

(65) Prior Publication Data

US 2014/0140570 A1    May 22, 2014

Related U.S. Application Data

(60) Provisional application No. 61/535,084, filed on Sep. 15, 2011.

(51) Int. Cl.
G06K 9/00    (2006.01)

(52) U.S. Cl.
CPC ................................. G06K 9/00577 (2013.01)

(58) Field of Classification Search
None
See application file for complete search history.

(56) References Cited

U.S. PATENT DOCUMENTS

| | | |
|---|---|---|
| 4,218,674 A | 8/1980 | Brosow et al. |
| 4,423,415 A | 12/1983 | Goldman |
| 4,677,435 A | 6/1987 | Causse D'Agraives et al. |
| 4,921,107 A | 5/1990 | Hofer |
| 5,031,223 A | 7/1991 | Rosenbaum |
| 5,079,714 A | 1/1992 | Manduley |
| 5,422,821 A | 6/1995 | Allen |
| 5,514,863 A | 5/1996 | Williams |
| 5,518,122 A | 5/1996 | Tilles |
| 5,703,783 A | 12/1997 | Allen et al. |
| 5,719,939 A | 2/1998 | Tel |
| 5,734,568 A | 3/1998 | Borgendale |

(Continued)

FOREIGN PATENT DOCUMENTS

| | | |
|---|---|---|
| EP | 0759596 A2 | 2/1997 |
| EP | 1016548 A2 | 7/2000 |

(Continued)

OTHER PUBLICATIONS

Huang et al. "An Online Ballistics Imaging System for Firearm Identification" 2010 2nd International Conference on Signal Processing Systems (ICSPS), hereinafter Huang.*

(Continued)

*Primary Examiner* — Bhavesh Mehta
*Assistant Examiner* — Oneal R Mistry
(74) *Attorney, Agent, or Firm* — Stolowitz Ford Cowger LLP

(57) ABSTRACT

A method/apparatus for identifying an object based on a pattern of structural features located in a particular region wherein the pattern comprises at least one fingerprint feature. The region may be recognized and used to identify the object. A first feature vector (FV) may be extracted from a first image of the pattern and may be mapped to an object identifier. To authenticate the object, a second FV may be extracted from a second image of the same region. The FVs may be compared and difference(s) determined. A match correlation value (MCV) may be calculated based on the difference(s). The difference(s) may be dampened if associated with expected wear and tear reducing the impact of the difference(s) on the MCV. The differences may be enhanced if associated with changes that are not explainable as wear and tear increasing the impact of the difference(s) on the MCV.

28 Claims, 7 Drawing Sheets

(56) References Cited

U.S. PATENT DOCUMENTS

| | | | |
|---|---|---|---|
| 5,745,590 A | 4/1998 | Pollard | |
| 5,883,971 A * | 3/1999 | Bolle et al. | 382/124 |
| 5,923,848 A | 7/1999 | Goodhand | |
| 6,246,794 B1 | 6/2001 | Kagehiro et al. | |
| 6,292,709 B1 | 9/2001 | Uhl | |
| 6,327,373 B1 | 12/2001 | Yura | |
| 6,343,327 B2 | 1/2002 | Daniels, Jr. | |
| 6,360,001 B1 | 3/2002 | Berger | |
| 6,370,259 B1 | 4/2002 | Hobson | |
| 6,434,601 B1 | 8/2002 | Rollins | |
| 6,470,091 B2 | 10/2002 | Koga | |
| 6,539,098 B1 | 3/2003 | Baker | |
| 6,549,892 B1 | 4/2003 | Sansone | |
| 6,697,500 B2 | 2/2004 | Woolston | |
| 6,741,724 B1 | 5/2004 | Bruce | |
| 6,768,810 B2 | 7/2004 | Emanuelsson | |
| 6,778,703 B1 | 8/2004 | Zlotnick | |
| 6,805,926 B2 | 10/2004 | Cote et al. | |
| 6,816,602 B2 | 11/2004 | Coffelt | |
| 6,829,369 B2 | 12/2004 | Poulin | |
| 6,985,926 B1 | 1/2006 | Ferlauto | |
| 7,121,458 B2 | 10/2006 | Avant | |
| 7,171,049 B2 | 1/2007 | Snapp | |
| 7,204,415 B2 | 4/2007 | Payne | |
| 7,212,949 B2 * | 5/2007 | Bachrach | 702/182 |
| 7,356,162 B2 | 4/2008 | Caillon | |
| 7,436,979 B2 | 10/2008 | Bruce et al. | |
| 7,518,080 B2 | 4/2009 | Amato | |
| 7,602,938 B2 * | 10/2009 | Prokoski | 382/100 |
| 7,674,995 B2 | 3/2010 | Desprez et al. | |
| 7,680,306 B2 | 3/2010 | Boutant et al. | |
| 7,720,256 B2 | 5/2010 | Desprez et al. | |
| 7,726,548 B2 | 6/2010 | deLaVergne | |
| 7,822,263 B1 * | 10/2010 | Prokoski | 382/152 |
| 7,834,289 B2 | 11/2010 | Orbke | |
| 7,853,792 B2 * | 12/2010 | Cowburn | 713/176 |
| 8,022,832 B2 | 9/2011 | Vogt et al. | |
| 8,108,309 B2 | 1/2012 | Tan | |
| 8,180,174 B2 | 5/2012 | Di Venuto et al. | |
| 8,428,772 B2 | 4/2013 | Miette et al. | |
| 8,477,992 B2 | 7/2013 | Paul et al. | |
| 8,520,888 B2 | 8/2013 | Spitzig et al. | |
| 8,526,743 B1 | 9/2013 | Campbell et al. | |
| 2001/0010334 A1 | 8/2001 | Park | |
| 2001/0054031 A1 | 12/2001 | Lee | |
| 2002/0015515 A1 * | 2/2002 | Lichtermann et al. | 382/124 |
| 2003/0046103 A1 | 3/2003 | Amato | |
| 2003/0091724 A1 * | 5/2003 | Mizoguchi | 427/1 |
| 2003/0120677 A1 | 6/2003 | Vernon | |
| 2003/0179931 A1 | 9/2003 | Sun | |
| 2003/0182018 A1 | 9/2003 | Snapp | |
| 2003/0208298 A1 | 11/2003 | Edmonds | |
| 2004/0027630 A1 * | 2/2004 | Lizotte | 359/15 |
| 2004/0112962 A1 * | 6/2004 | Farrall et al. | 235/462.01 |
| 2004/0218791 A1 * | 11/2004 | Jiang et al. | 382/124 |
| 2005/0065719 A1 | 3/2005 | Khan | |
| 2005/0086256 A1 | 4/2005 | Owens | |
| 2005/0119786 A1 | 6/2005 | Kadaba | |
| 2005/0131576 A1 | 6/2005 | DeLeo | |
| 2005/0188213 A1 * | 8/2005 | Xu | 713/186 |
| 2005/0251285 A1 | 11/2005 | Boyce | |
| 2005/0257064 A1 | 11/2005 | Boutant et al. | |
| 2006/0010503 A1 | 1/2006 | Inoue et al. | |
| 2006/0083414 A1 * | 4/2006 | Neumann et al. | 382/125 |
| 2006/0131518 A1 * | 6/2006 | Ross et al. | 250/556 |
| 2006/0177104 A1 * | 8/2006 | Prokoski | 382/108 |
| 2007/0094155 A1 | 4/2007 | Dearing | |
| 2007/0263267 A1 * | 11/2007 | Ditt | 358/540 |
| 2007/0282900 A1 | 12/2007 | Owens | |
| 2008/0011841 A1 | 1/2008 | Self et al. | |
| 2008/0130947 A1 | 6/2008 | Ross | |
| 2008/0219503 A1 * | 9/2008 | Di Venuto et al. | 382/103 |
| 2008/0250483 A1 | 10/2008 | Lee | |
| 2008/0255758 A1 | 10/2008 | Graham | |
| 2008/0272585 A1 | 11/2008 | Conard et al. | |
| 2008/0294474 A1 | 11/2008 | Furka | |
| 2009/0028379 A1 * | 1/2009 | Belanger et al. | 382/100 |
| 2009/0057207 A1 | 3/2009 | Orbke | |
| 2009/0106042 A1 | 4/2009 | Maytal et al. | |
| 2009/0157733 A1 | 6/2009 | Kim | |
| 2009/0271029 A1 | 10/2009 | Doutre | |
| 2009/0307005 A1 | 12/2009 | O'Martin | |
| 2010/0027834 A1 | 2/2010 | Spitzig et al. | |
| 2010/0104200 A1 | 4/2010 | Baras et al. | |
| 2010/0163612 A1 | 7/2010 | Caillon | |
| 2010/0166303 A1 | 7/2010 | Rahimi | |
| 2011/0161117 A1 | 6/2011 | Busque et al. | |
| 2011/0194780 A1 * | 8/2011 | Li et al. | 382/218 |
| 2011/0235920 A1 * | 9/2011 | Iwamoto et al. | 382/195 |
| 2012/0130868 A1 | 5/2012 | Loken | |
| 2012/0250945 A1 * | 10/2012 | Peng et al. | 382/107 |
| 2013/0284803 A1 * | 10/2013 | Wood et al. | 235/375 |
| 2014/0184843 A1 | 7/2014 | Campbell | |
| 2014/0270341 A1 | 9/2014 | Elmenhurst | |
| 2015/0067346 A1 | 3/2015 | Ross | |
| 2015/0117701 A1 | 4/2015 | Ross | |

FOREIGN PATENT DOCUMENTS

| | | |
|---|---|---|
| EP | 2195621 | 6/2010 |
| EP | 2869240 A2 | 5/2015 |
| EP | 2869241 A2 | 5/2015 |
| GB | 2097979 | 11/1982 |
| JP | 61234481 A | 10/1986 |
| WO | 2006038114 A1 | 4/2006 |
| WO | 2007/071788 A1 | 6/2007 |
| WO | 20007090437 | 8/2007 |
| WO | 2012145842 A1 | 11/2010 |
| WO | 2013/126221 A1 | 8/2013 |

OTHER PUBLICATIONS

Leng et al. "A Novel Binarization Algorithms for Ballistics Imaging Systems" 2010 3rd International Congress on Image and Signal Processing (CISP2010), hereinafter Leng.*

Clifton Smith. "Fireball: A Forensic Ballistic Imaging System", Security Sciense, Edith Cowan University, IEEE, 1997 hereinafter Smith.*

Li. "Firearm Identification System Based on Ballistics Image Processing", 2008 Congress on Image and Signal Processing, hereinafter Li.*

Li et al. "Image processing for the positive identification of forensic ballistics specimens" IEEE , 2003.*

United States Postal Service, "NCOALink Systems", http://www.usps.com/ncsc/addressservices/moveupdate/changeaddress.htm, website accessed Jun. 23, 2010, 2 pages.

United States Postal Service Publication 28 "Postal Addressing Standards", dated Jul. 2008; text plus Appendix A only; 55 pages.

NCOA Link at http://ribbs.usps.gov/ncoalink/ncoalink_print.htm; dated May 27, 2009; 3 pages.

Online NCOALink Processing Acknowledgement Form (PAF) Released by Lorton Data; http://us.generation-nt.com/online-ncoalink-processing-acknowledgement-form-paf-released-by-press-1567191.html; release dated Jun. 2, 2009; 1 page.

Stolowitz Ford Cowger LLP, "Listing of Related Cases", dated Nov. 4, 2013; 1 page.

European Patent Office; Extended European Search Report, EP 14191546.2; dated May 8, 2015; 9 pages.

European Patent Office; Extended European Search Report, EP 14191548.8; dated May 21, 2015; 6 pages.

* cited by examiner

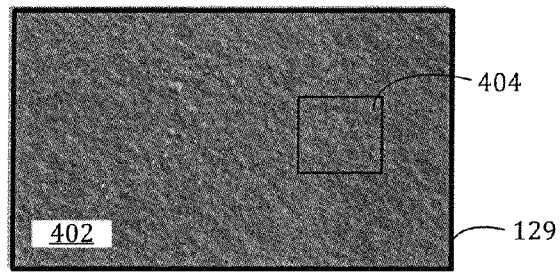
FIG. 4a
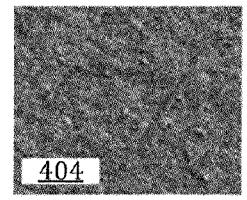
FIG. 4b
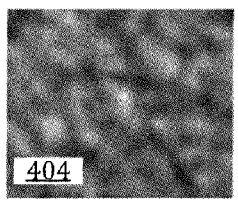
FIG. 4c
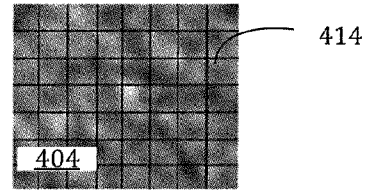
FIG. 4d
FIG. 4e

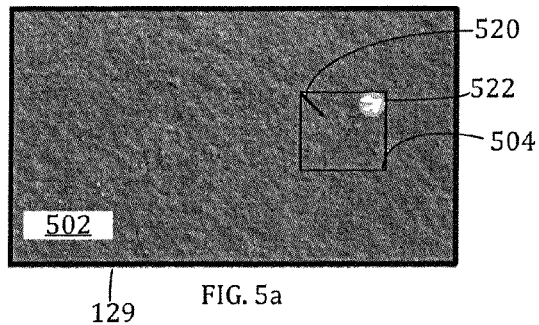
FIG. 5a
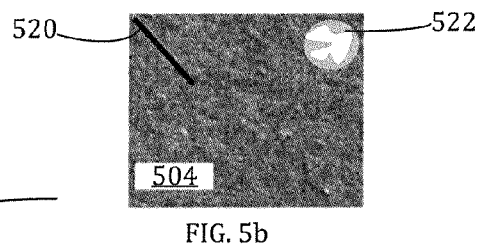
FIG. 5b
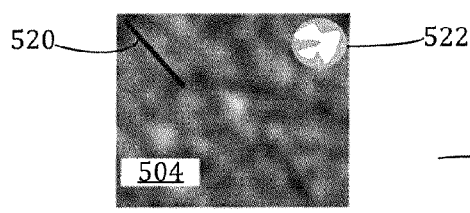
FIG. 5c
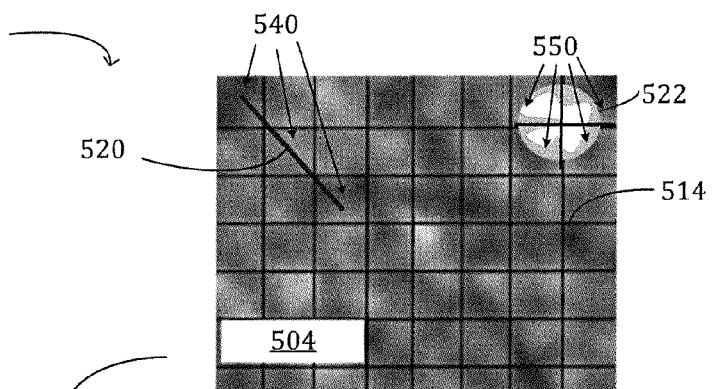
FIG. 5d
FIG. 5e

|   |   |   |   |   |   |   |   |
|---|---|---|---|---|---|---|---|
| 1 | 0 | 0 | 0 | 0 | 0 | 580 | 1120 |
| 0 | 14.8 | 0 | 0 | 0 | 0 | 1320 | 1220 |
| 0 | 0 | 7.1 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 6

OBJECT IDENTIFICATION AND INVENTORY MANAGEMENT

RELATED PATENTS

This application claims priority to U.S. Provisional Patent Application No. 61/535,084, entitled "WEAPON IDENTIFICATION AND INVENTORY MANAGEMENT," filed Sep. 15, 2011 which is incorporated herein by this reference in its entirety.

TECHNICAL FIELD

This disclosure describes a system for object identification and inventory management utilizing "fingerprinting" technology.

BACKGROUND

Currently, an object may be tracked and/or inventoried by using a unique marking system. Objects may be physically marked with a unique serial number. The serial number may be engraved on the object and/or may be printed or engraved on a tag and affixed to the object by any of a variety of means. The serial number may be obscured purposely or inadvertently by physical damage and/or by loss of the tag. For the purposes of authenticating, tracking and inventorying an object an obscured or lost serial number may be ineffective.

Marking certain objects would damage or destroy the value of the object. Art work, gemstones, and collector-grade coins are examples. Identifying or certifying information may be obtained concerning such objects but if they are attached or otherwise physically associated with the object, they are subject to getting lost or being altered. If identifying or certifying information is stored separately from the object, the entire identification/certification process must be performed again if the object is lost and later recovered or its chain of control is otherwise compromised.

BRIEF DESCRIPTION OF THE DRAWINGS

FIG. 4a depicts an example of a high resolution image captured for object identification and inventory management.

FIG. 4b depicts an example of a high resolution image captured for object identification and inventory management.

FIG. 4c depicts an example of a high resolution image captured for object identification and inventory management.

FIG. 4d depicts an example of a high resolution image captured for object identification and inventory management.

FIG. 4e depicts an example of a feature vector including numerical values representing fingerprint features associated with a high resolution image for object identification and inventory management.

FIG. 5a depicts an example of a high resolution image captured for object identification and inventory management.

FIG. 5b depicts an example of a high resolution image captured for object identification and inventory management.

FIG. 5c depicts an example of a high resolution image captured for object identification and inventory management.

FIG. 5d depicts an example of a high resolution image captured for object identification and inventory management.

FIG. 5e depicts an example of a feature vector including numerical values representing fingerprint features associated with a high resolution image for object identification and inventory management.

FIG. 6 depicts a table showing differences between two feature vectors.

DESCRIPTION OF EXAMPLES

Summary

Figure 1:
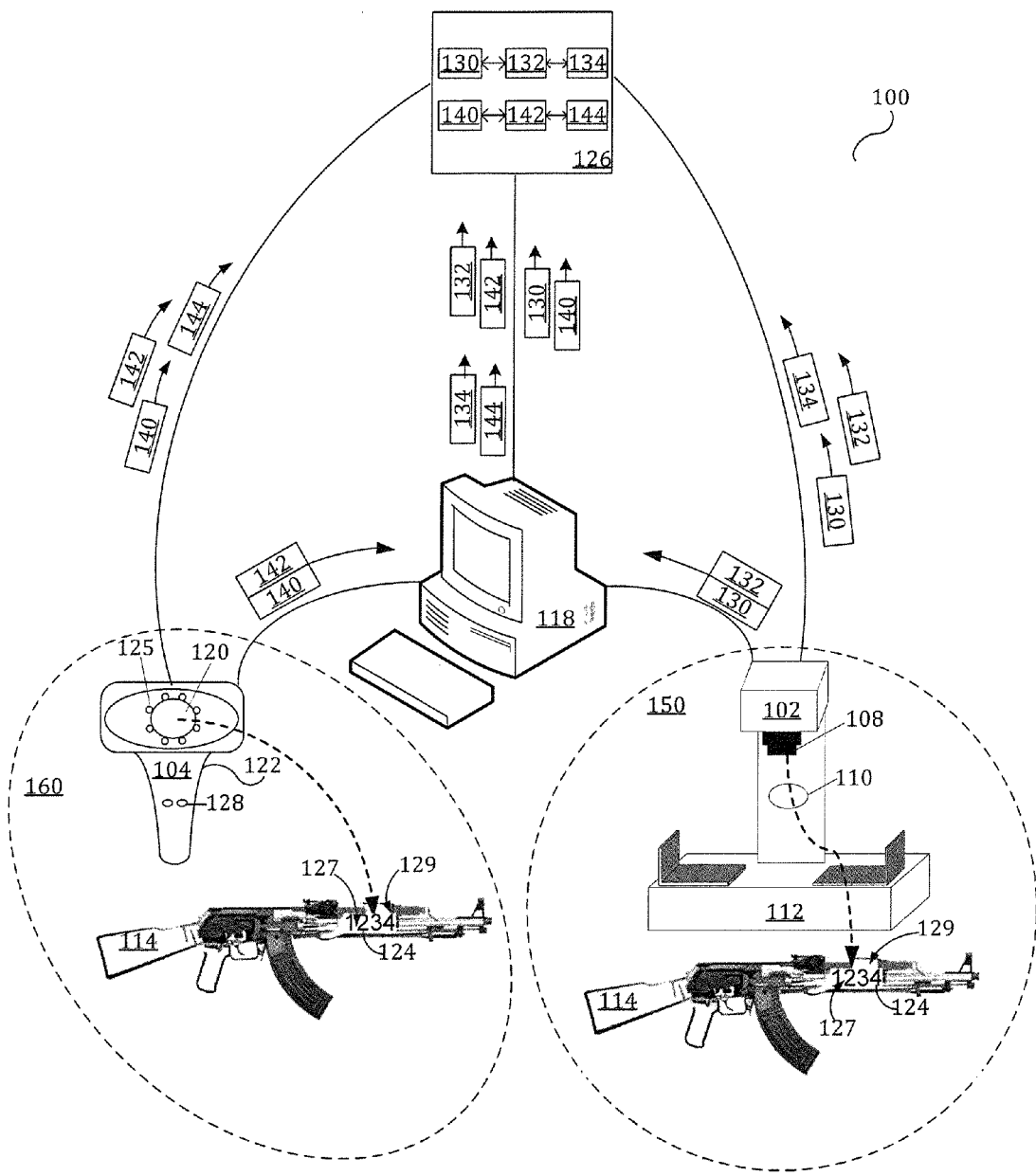
FIG. 1 depicts an example of a system for object identification and inventory management.

Disclosed is a system for identification, tracking and/or inventory management of one or more objects (e.g., a weapon, a coin, a gem, a document, an animal, or the like, or combinations thereof). In an example, an object, such as a weapon, may be identified by generating a feature vector associated with a specific physical region of the weapon. An image of the physical region may be captured using a high-resolution imaging device. The physical region may be identified according to a proximity to or offset from one or more physical features of the object. In a first instance (such as when the weapon is issued), image data associated with the captured image may processed to identify one or more fingerprint features and to extract a first feature vector based on the fingerprint features. A "fingerprint feature" is a feature of the object that is innate to the object itself (the way human fingerprints are), a result of the manufacturing process, a result of external processes, or of any other random or pseudo random process. The first feature vector may be associated with an object identifier. The first feature vector and identifier may be recorded in a secure file or location. In a second instance, the physical region of a purportedly same object may again be captured using a high-resolution imaging device and a second feature vector extracted. The object identifier may be used to retrieve the record of the associated first feature vector. The first feature vector and the second feature vector may be compared to determine whether the object associated with the first feature vector is the same object corresponding to the second feature vector. To determine if the second feature vector and the first feature vector are sufficiently similar to establish within a particular confidence level that they both came from the same object, difference values between the second feature vector and the first feature vector may be processed to determine the degree of match or mismatch of the feature vectors. The processing of the difference values may comprise a method to modify the difference values to dampen differences that do not contribute to object identification and to enhance differences that do contribute to object identification.

This application may be exemplified in many different forms and should not be construed as being limited to the examples set forth herein. Several examples of the present application will now be described with reference to the accompanying drawings. The figures listed above illustrate various examples of the application and the operation of such examples. In the figures, the size of the boxes is not intended to represent the size of the various physical components. Only those parts of the various units are shown and described which are necessary to convey an understanding of the examples to those skilled in the art.

The disclosed technology is described with reference to embodiments involving identification and inventory management of weaponry. However, the principles disclosed herein are equally applicable to identification and inventory management of a variety of objects characterized by distinguishable physical features for example, coins, gems, paper documents, animals, artwork, and the like or combinations thereof. The physical features may be observable with the naked eye and/or be microscopic in scale. Thus, various other examples of the disclosed technology are also possible and practical.

Additional aspects and advantages will be apparent from the following detailed description of example embodiments. The illustrated example embodiments and features are offered by way of example and not limitation. Furthermore, the described features, structures, or characteristics may be combined in any suitable manner in one or more examples.

In general, the methodologies of the present disclosed technology may be carried out using one or more digital processors, for example the types of microprocessors that are commonly found in mobile telephones, PC's, servers, laptops, Personal Data Assistants (PDAs) and all manner of desktop or portable electronic appliances.

In the following description, certain specific details of programming, software modules, user selections, network transactions, database queries, database structures, etc., are provided for a thorough understanding of the example embodiments of the disclosed technology. However, those skilled in the art will recognize that the disclosed technology can be practiced without one or more of the specific details, or with other methods, components, materials, etc.

The term "recognize" is a term of art used throughout the following description that refers to systems, software and processes that glean or "figure out" information, for example alphanumeric information, from digital image data. "Recognition" may include not only character recognition, but also relative location of characters, fields, etc. Details are known in other contexts such as mail handling, document capture, and object recognition.

FIG. 1 depicts an example of a system 100 configured to identify, track and/or inventory objects. For simplicity, the following discussion describes examples wherein the object is a weapon 114 and system 100 is configured for weapon inventory management beginning when a weapon 114 is issued through ultimate disposal or surrender of weapon 114.

System 100 may comprise a high-resolution imaging (HRI) system 102 and/or a hand-held imaging (HHI) system 104. The imaging systems may be configured to capture any of a variety of images including digital images, ultrasound images, x-ray images, thermal images, microscopic digital images, images providing depth and/or topological information, and the like, or any combinations thereof.

HRI 102 may be located at a Central Inventory Control Point (CICP) 150 or any location conducive to manufacture, collection, storage, distribution and/or reclamation of weaponry. Weapon 114 may be issued at CICP 150. HRI 102 may be configured to initially identify weapon 114 and associate the identification information with personnel to whom the weapon 114 is issued.

HHI 104 may be located at a Forward Operating Base 160 that is remote from CICP 150. Weapon 114 may be checked at FOB 160 for surrender, disposal, and/or tracking. HHI 104 may be configured to identify weapon 114 for authentication and/or to verify that an authorized person is in possession of and/or surrendering weapon 114. In an example, weapon 114 may comprise several parts including a barrel, stock, sights and etc. Each part may be identified and/or cataloged separately and/or a single part may represent the entire weapon 114.

In an example, when weapon 114 is issued at CICP 150, HRI 102 may capture a first image 402 (see, for example FIG. 4a) of a specific region 129 of weapon 114 including a structure 124. Region 129 may be identified as an offset from structure 124. The location of region 129 may be known only to the identification system and not to any personnel involved in the identification process. In an example, weapon 114 may have a unique surface crystal and abrasion structure from its manufacture and previous history. The surface crystal and abrasion structure may form random patterns. In addition, anything stamped into weapon 114 (e.g. the serial number) may have random imperfections that are unique to weapon 114, even if the exact same die is used to stamp the next weapon on the assembly line. Further, after weapon 114 has spent time in the field, it acquires scratches and other imperfections that are also random. Thus, region 129 may include a unique pattern of crystals and/or abrasions comprising at least one fingerprint feature. System 100 may extract a first feature vector 134 to store data corresponding to the at least one fingerprint feature from image data 130 associated with the first image 402.

When weapon 114 is checked at FOB 160, HHI 104 may capture a second image 502 (see FIG. 5a) of region 129 and extract a second feature vector 144 from image data 140 associated with the second image 502. First feature vector 134 and second feature vector 144 may be compared to authenticate weapon 114. In other examples, either or both systems HRI 102 or HHI 104 may be used to extract the first and/or second feature vectors at issuance or when weapon 114 is checked for surrender, disposal and/or tracking anywhere and at any time and claimed subject matter is not limited in this regard.

In an example, HRI 102 may comprise an imaging device 108, a non-specular illumination system 110, and/or a mount 112 to hold weapon 114 in place. HRI 102 may be configured with specialized optical recognition software to identify structure 124 to locate region 129 of weapon 114. In another example, structure 124 and/or region 129 may be located by a user, manually. Weapon 114 may be positioned on HRI 102 in such a way as to facilitate imaging of region 129. Structure 124 may be a serial number and/or any other distinguishable physical feature of weapon 114 (e.g., front or rear sight, barrel, muzzle, trigger, safety latch, model stamp, or the like, or any combinations thereof). HRI 102 may capture first image 402 of region 129. Image 402 may show elements of a grain surface within region 129 proximate structure 124 and/or imperfections in the surface and/or imperfections in the structure 124, itself. With respect to FIG. 1, structure 124 is the stamped serial number. In an example embodiment, system 100 may be configured to recognize the serial number from first image 402 and may use an ASCII string for that serial number as a database index referring to weapon 114 in inventory control database 126. Through this recognition (e.g. of the weapon's serial number) the claimed identity of an object such as weapon 114 may be established. In alternative embodiments, the claimed identity may be entered by a user or captured from a tag or other item not part of the object.

In an example, HRI 102 may be configured to generate image data 130 associated with image 402. HRI 102 may include a local processor to process image data 130. Image data 130 may be processed by HRI 102 to generate first feature vector 134. Processing image data 130 may comprise identifying fingerprint features 127 on a surface of weapon 114 within region 129 and expressing the fingerprint features as one or more values to generate first feature vector 134. HRI 102 may be configured to store image data 130 and/or first feature vector 134 in inventory control database 126 in communication with HRI 102. Image data 130 and/or first feature vector 134 may be encrypted. In another example, HRI 102 may include a remote computer 118 configured to process image data 130 to extract first feature vector 134. Computer 118 may store image data 130 and/or first feature vector 134 in inventory control database 126. In another example, inventory control database 126 may be stored in a memory component of HRI 102.

In an example, HRI 102 may be configured to receive and/or generate additional data 132 to be entered into inventory control database 126 in association with image data 130 and/or first feature vector 134. The additional data may include data identifying a person to whom weapon 114 is being issued, a serial number, a time and/or date stamp, geographical location information, weapon 114 status (e.g., condition, age, wear, parts missing, and the like), or the like and any combinations thereof. In an example, data to be entered into inventory control database 126 may be secured by any of a variety of data security techniques, such as by encrypting.

The above are performed when the weapon is first cataloged. The same imaging and recognition system may be used later when the weapon is received back from an FOB 160 for ultimate disposal. At that point another high-resolution image of the identifying region may be extracted, the serial number may be recognized or otherwise identified, the feature vector 134 may be extracted, and comparison may be made between the cataloged feature vector and the newly-captured one to determine the degree of certainty that this is the original weapon. In addition, this system may also allow for manual comparison of the identifying region images created at issue and at disposal.

Referring still to FIG. 1, in an example, weapon 114 may be surrendered or otherwise returned to a site that is remote from the location of HRI 102 such as an FOB 160. FOB 160 may not have access to technological capabilities available at CICP 150. An HHI 104 may be a portable handheld imaging device comprising at least one lens 120, a handle 122, actuator button(s) 128 and/or illumination source(s) 125. HHI 104 may be available at FOB 160. If weapon 114 is returned to or checked at FOB 160, weapon 114 may be authenticated with HHI 104. HHI 104 may be configured with specialized software to locate region 129 of weapon 114 including structure 124 (e.g., the serial number). HHI 104 may be configured to capture a second image 502 of region 129 and to extract a second feature vector 144 from second image data 140. Second feature vector 144 may comprise at least one value representing fingerprint feature 127. HHI 104 may comprise a memory for storing image data 140 associated with image 502 and/or a processing device for processing the image data 140. In another example, HHI 104 may communicate the image data 140 associated with image 502 to computer 118 for processing. Computer 118 may generate second feature vector 144 and/or may store feature vector 144 and image data 130 in inventory control database 126 for processing at a later time. In another example, inventory control database 126 may be stored in a memory component of HHI 104.

In an example, weapon 114 may be identified in inventory control database 126 according to the serial number marking on weapon 114. HHI 104 may be configured to recognize the serial number or the serial number may be entered by other means. HHI 104 may access inventory control database 126 using the serial number to look up a stored first feature vector 134. HHI 104 may access first feature vector 134 from database 126 according to any of a variety of other associations, such as, by serial number, assignment to a particular person, description, or color code, and the like, or any combinations thereof.

HHI 104 may be configured to compare first feature vector 134 and second feature vector 144 to authenticate weapon 114. HHI 104 may authenticate weapon 114 by determining whether first feature vector 134 and second feature vector 144 match to a predetermined identification certainty level. The match may be determined by the degree of correspondence of the patterns (or features extracted from those patterns) in the first feature vector 134 and the second feature vector 144. If a match is sufficiently close, weapon 114 may be verified as authentic. The comparison of first feature vector 134 and second feature vector 144 may dampen or enhance differences in the first and second feature vectors due to natural causes such as wear and tear and/or corrosion. For example, region 129 of which both images 402 and 502 are taken is not likely to suffer less damage once weapon 114 is in the field. However, weapon 114 may suffer more damage. As a result, when comparing the first feature vector 134 and the second feature vector 144 the program that determines the certainty of a match between the first and second feature vectors asymmetrically. That is, a scratch (for example) that exists in the later image but not in the earlier image may add only a small amount of distance between the two feature vectors (and the differences it creates be dampened), while a scratch in the earlier image that is not in the later contributes a large amount of distance (and its effects be enhanced since there is no reasonable way for a scratch to be removed in the field). Thus, the comparison may minimize or enhance degradation of a match confidence level based on such differences. Thus, when surrendered, weapon 114 may still be authenticated despite changes in fingerprint features 127 attributable to natural wear and tear.

In an example, initially HRI 102 may extract several first feature vectors from corresponding images of a plurality of regions of weapon 114. Thus, when the weapon 114 is checked-in or surrendered the same plurality of regions may be imaged by HHI 104 and second feature vectors may be extracted from those corresponding images. Comparing the plurality of first feature vectors with the corresponding plurality of second feature vectors may improve match certainty.

Processing of image data 140 may be executed in HHI 104 and/or in computer 118 and claimed subject matter is not limited in this regard. For example, the extraction and/or comparison of first feature vector 134 and second feature vector 144 may be executed by computer 118. Alternatively, first image 402 and second image 502 may be manually compared. HHI 104 may store and/or associate image data 140, second feature vector 144 and/or an identification certainty level in database 126.

HHI 104 may encrypt image data 140, second feature vector 144 and/or an identification certainty level prior to storing in database 126. In another embodiment HRI 102 may be configured to authenticate weapon 114.

The identification certainty level associated with a match between feature vectors may vary. For example, a certainty level associated with a match between feature vectors extracted from image data generated by different devices may be lower than a certainty level associated with a match between feature vectors extracted from image data generated by the same device.

In an example, HHI 104 may be configured to receive and/or generate additional data 142 to be entered into inventory control database 126 in association with image data 140 and/or second feature vector 144. The additional data may include data identifying a person to surrendering or checking-in weapon 114, the weapon 114 serial number, a time and/or date stamp, geographical location information, weapon 114 status (e.g., condition, age, wear, parts missing, and the like), or the like and any combinations thereof.

Weapon 114 may inducted into a control system at the FOB 160 and sent back to the central inventory control point 150 (an armory, a refurbishment point, disposal point, or other centralized location). An additional (third) high-resolution image may be taken with the HRI 102 described above and comparisons made with the first image. This can be done if the FOB hand-held system HHI 104 does not have sufficiently high confidence in a match. In addition, the proposed field system may allow manual comparison of the old and the new serial number region images for identification where the automatic system is insufficiently certain. HRI 102 may be configured to provide an image with a higher-resolution than HHI 104. Thus, if a confidence level in a match or non-match is not sufficiently certain, an additional image of region 129 may be captured by HRI 102 when weapon 114 is surrendered or checked-in in order to improve the confidence level associated with the match.

In the above examples, system 100 is configured to identify, track and/or inventory weapon 114. However, system 100 may be configured to identify, track and/or inventory any of a variety of objects, for example, Pilot whales, coins and/or gemstones and claimed subject matter is not limited in this regard.

Figure 2:
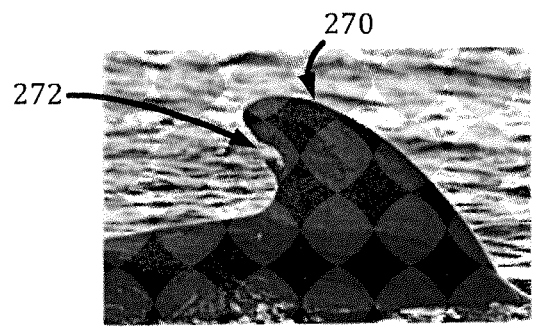
FIG. 2 depicts an example of an object for identification and inventory management.

In an example, feature vectors may be used to track pilot whales. Referring now to FIG. 2, pilot whales have a dorsal fin 270 that extends out of the water and is easy to photograph. The posterior part of these fins is very thin (the fins are shaped like airfoils) and is very often damaged by shark bites 272 in the normal course of life of the pilot whales. Using a digital camera, an image of the dorsal fin may be captured. Features along the posterior edge of the fin may be identified as fingerprint features. A feature vector comprising representations of the fingerprint features may be generated from the digital image data. The feature vector may be associated with an identifier for the pilot whale (e.g., the whale's "name") in a database. When an unidentified whale is photographed, the features of its dorsal fin may be extracted and the resulting feature vector may be compared with those in the database. If a sufficiently good match is obtained, the whale may be identified.

The whale may sustain additional damage to the dorsal fin after the initial image was collected due to new shark bites and other causes of wear and tear. In an example, the comparison procedure may use subtractive features of the fin, thus differences between the feature vectors may be dampened where such differences may be associated with new shark bites and other natural causes of wear and tear. In other words, new bite marks may not strongly degrade the match if older bite marks are removed due to a deeper new bite. However, if the later fin image has dorsal fin material where the original does not (i.e. it lacks a bite mark where the original had one), the difference between the two feature vectors values is not dampened. Such a difference that is not attributable to a natural cause may even be amplified thus degrading the match considerably more than a dampened difference. Therefore, a match may not be identified where difference between the feature vectors are not attributable to natural causes and are thus amplified.

Figure 3:
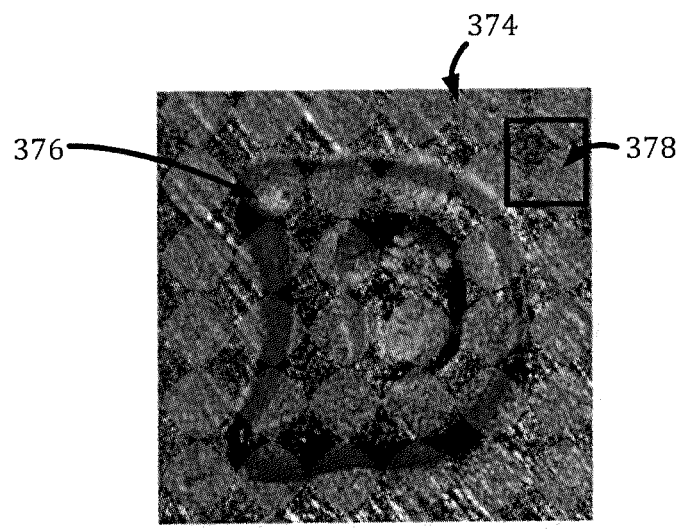
FIG. 3 depicts an example of an object for identification and inventory management.

In another embodiment, feature vectors may be used to identify coins. Clearly it is not desirable to inscribe a high-value coin with an identifying serial number because it may devalue the coin and the same serial number may be inscribed on a coin of lesser value. Referring now to FIG. 3, a coin 374 may comprise two random feature types, wear marks 376 and/or a crystal pattern 378 in the surface of the coin. In the former case, prior to cataloging, coin 374 may have been pressed against other coins in a bag or suffered other marks. Coin 374 may have different microscopic (or near-microscopic) features in the way the surface crystals of the metal fractured when the coin was struck. Since these depend on the alignment of crystal boundaries in the coin blank, and since that alignment is random, these prove a good feature set even if the coin is cataloged directly after stamping. In addition, no two stampings leave exactly the same image, even two stampings in a row from the same die. Because the pattern of wear marks 376 and/or the crystal pattern 378 are random either or both may serve as fingerprint features from which a feature vector may be calculated and used for identification. Authentication of coin 374 may be executed by comparing a feature vector known to be an authentic representation of coin 374 to a feature vector to be authenticated. Differences between feature vectors may be minimized where the differences may be attributable to the effects of natural wear and tear effect. Differences between feature vectors may be magnified where the differences are not attributed to the effects of natural wear and tear effect.

Similarly, gem stones have an optical or X-ray crystal pattern which provides an identifying feature set. Every gem stone is unique and every gem stone has a series of random flaws in its crystal structure. Indeed, even the most perfect and high-value natural stones have an internal crystal structure that has a great many flaws. The crystal pattern may be used to generate feature vectors for identification and authentication.

In an example embodiment, determining whether two objects are really the same object may depend on a degree of match of their features, not substantially on the degree of mismatch. This is true because the random or pseudo-random fingerprint features on an object that may be used for identification are subject to modification after the first feature vector is extracted and stored. A weapon, for example, may receive a scratch through part of the critical area, a document may get a coffee stain, a pilot whale may receive a new shark bite in its dorsal fin. All of these are normal changes that may occur in the course of the life of the object. When the second feature vector, extracted after the changes occur, is compared with the first, the elements of the second vector that correspond to the areas associated with the fingerprint features that underwent change may be substantially different from those in the first feature vector. These changes, however, do not indicate that the two feature vectors were extracted from different objects. The vector comparison process, therefore, seeks to dampen the effects of such changes.

On the other hand, coffee stains do not disappear, scratches remove themselves, or shark-bitten dorsal fins heal themselves. When there is no natural process that can explain the differences (the apparent disappearance of a shark bite for example), those differences may be enhanced in comparing the two feature vectors because they focus in on differences far more likely to be caused by the feature vectors coming from two different objects than from any natural changes in the same object.

The purpose of both enhancement and dampening is to stress that, when it comes to identifying an object it is the areas in the second feature vector that match the areas in the first that are of substantial significance. If enough match, the fact that others are substantially different in an explainable way is not important. Also of substantial significance are those areas that are different in ways that are very unlikely to occur naturally. These differences may be enhanced in importance because they are strongly indicative that the two vectors came from different objects. Finally, differences that occur or could occur naturally say almost nothing about whether the two feature vectors describe the same object. Those features are dampened in the comparison of the two feature vectors.

There are many ways to accomplish such dampening, enhancing, and determining degree of match (rather than degree of mismatch). Below are three examples of methods to dampen and/or enhance differences between vectors. In each case, two feature vectors are represented, a first feature vector extracted from an object first in time or at time of indexing and a second feature vector extracted later in time or at the time of identification/verification of the object. In some embodiments, a set comprising a plurality of several such feature vectors may be processed for each object. A plurality of feature vectors may each be extracted from images of different structures or regions on the object. In the following example methods, a singular feature vector is described. However, the methods may be applied to all feature vectors with, for example, their effects simply added together or combined in other ways to get a figure of merit for the entire object.

Assume also for discussion that the "feature vector" is a 5×5 grayscale (levels 0-255) of a region of the object. The vector is a 25-long array of numbers, formed by taking the first row of the 5×5 array and making that the first five entries in the feature vector, the second row becoming the next five and so on.

Method 1: Calculate a new vector whose entries are the squares of the differences of the two vectors. Take a pre-determined threshold and count the number of entries in this resulting vector below that threshold. The pre-determined threshold is chosen such that two images of the same region on the same object are very likely to match within the threshold and two random images are not.

If the number of within-threshold features is above some predetermined number (say 10 so that 10 of the 25 regions on the two objects match very well) call that a match for the object with the original.

Method 2: Take the two feature vectors as above. Assume the numbers in each run from 0-255. Assume a match distance (chosen based on experience in testing this kind of object, for example). As an example, let that distance be 4. If the two values match within +/−4, the probability of that happening randomly is 8/256 or about 3%. Calculate for each slot the probability that the two vector values are an accidental match and then calculate the overall probability that this might be a false positive by multiplying those results together. If, for example 10 of the vectors match within the range +/−4, there is only a 0.03^10 chance the result is random. If it is not random, it must be because the second vector matches the first to high probability. If the probability of a mismatch is sufficiently low, call it a match.

Method 3: Calculate the difference vector as in method 1. Sum the results. Subtract that result from 25×255×255 (the largest possible distance vector magnitude). Threshold the result like a normal distance calculation, so that if the result is low enough it is a match. All of these have the same intent: measure degree of match, not degree of mismatch. Prior to performing such operations it may be preferable to perform enhancement or dampening of features as discussed above. There are many other ways to accomplish this besides those mentioned and claimed subject matter is not limited in this regard.

FIGS. 4a-4e depict examples of a first micrograph image 402 and a first feature vector 134 for generating a first feature vector associated with weapon 114. The first micrograph image 402 may be taken when weapon 114 is issued, for example, at a central inventory control point 150.

FIG. 4a depicts an example of first micrograph image 402 focused on a selected region 129 of a metal surface of weapon 114. Selected region 129 may be chosen based on a proximity to a particular structure 124 of weapon 114 such as a serial number. Regions located proximate to other structures of weapon 114 may be selected, such as a forward sight or rear sight, and claimed subject matter is not limited in this regard. A smaller area 404 is highlighted within region 430. Area 404 may include one or more fingerprint features 127 and may be identified based on an offset from structure 124 and selected for feature vector extraction.

FIG. 4b is a detailed view of the highlighted area 404 in FIG. 4a.

FIG. 4c is an example of area 404 of image 402 prepared for feature vector extraction. In an example, area 404 may be blurred and/or contrasted until the average grayscale is 127 out of 255. In an example, a histogram of area 404 may be modified so that the darkest regions are just barely not saturated black (e.g., having a pixel value of 0), the lightest regions are just barely not saturated white (e.g., having a pixel value of 255), and the average threshold value is 127 (i.e., halfway).

FIG. 4d depicts area 404 divided into a grid 414 having 56 equal regions. The average grayscale level in each of the 56 regions may be selected as representative features for a fingerprint feature value set of feature vector 134. However, this is merely one example of a method of preparing an image for feature vector extraction. In another example, a feature vector may be generated from area 404 without modifying the grayscale and generating a feature vector representing each of the pixels in area 404.

FIG. 4e depicts an example of first feature vector 134 comprising a table of numerical values of the average grayscale in each of the 56 regions of grid 414. First feature vector 134 is merely an example of a method of extracting a feature vector from an image. There are a variety of methods of extracting feature vectors known to those of skill in the art and claimed subject matter is not limited in this regard.

FIGS. 5a-5e depict examples of a second micrograph image 502 and second feature vector 144 associated with a weapon purported to be weapon 114. The second micrograph image 502 may be taken at a FOB 160.

FIG. 5a depicts an example of a second micrograph image 502 which may be focused on selected region 129 if imaging weapon 114. Image 502 includes a deformation 520 within highlighted area 504. Deformation 520 is not visible in image 402. Deformation 520 shows up in image 502 as a dark line. Deformation 520 may be an abrasion weapon 114 received in the field. Image 502 also includes a light portion 522 within highlighted area 404 that is not visible in image 402. Light area 522 may represent a different elevated portion or different pattern of crystal and/or abrasion features from that visible in image 402. Light area 522 may not be attributable to natural wear and tear a weapon may receive in the field and may call into question the authenticity of the weapon purporting to be weapon 114.

FIG. 5b is a detailed view of the highlighted area 504 in FIG. 5a showing deformation 520 and light portion 522.

FIG. 5c is an example of area 504 prepared for feature extraction. Area 504 is prepared in the same way area 404 was prepared for feature vector extraction and is blurred and/or contrasted until the average grayscale is 127 out of 255. A histogram of area 504 may be modified so that the darkest regions are just barely not saturated black (e.g., having a pixel value of 0), the lightest regions are just barely not saturated white (e.g., having a pixel value of 255), and the average threshold value is 127 (i.e., halfway).

FIG. 5d depicts area 504 divided into a grid 514 having 56 equal regions, as was area 404 in FIG. 4d. The 56 regions may comprise fingerprint features based on grayscale. The average grayscale level in most of the 56 regions match the average grayscale in corresponding regions of area 404 in FIG. 4d with the exception of the regions changed by the deformation 520 and light portion 522. Regions 540 will have a lower grayscale value than the corresponding regions in FIG. 4d due to an overall darkening effect caused by the deformation 520. Regions 550 will have a higher grayscale value due to an overall lightening effect caused by light portion 522.

FIG. 5e depicts an example of second feature vector 144 comprising a table of numerical values representing fingerprint features. The values are of the average grayscale in each of the 56 regions of grid 514. Regions 540 have a lower numerical value than corresponding regions 440 in first feature vector 134 because deformation 520 darkened these regions in area 504 lowering the grayscale values. Similarly, regions 550 have higher numerical values than corresponding regions in 450 in first feature vector 134 because the light portion 522 lightened these regions in area 504 increasing the grayscale values.

FIG. 6 is a table 610 comprising a difference vector showing the difference between first feature vector 134 and second feature vector 144 wherein differences attributable to normal wear and tear are dampened and differences that are not attributable to normal wear and tear are enhanced.

In an example, feature vector 134 was extracted first in time so feature vector 144 may be subtracted from feature vector 410 to render the difference shown in table 610. In an example, based on observation or other data, it may be determined that a positive difference such as in fields 640 may correlate to effects of normal wear and tear on weapon 114. Thus, positive differences between feature vector 410 and feature vector 510 may be dampened to reduce the effect a positive difference has on a match correlation value in determining a match between feature vector 410 and feature vector 510. For example, dampening may comprise dividing by 10 each positive value by 10 giving field 640 values of 1, 14.8 and 7.1 respective.

Similarly, it may be determined that negative differences (due to average lightening of an area in image 502) are not likely to have arisen naturally due to normal wear and tear of weapon 114 and may be present because the weapon returned is not the same weapon issued. Lighter area 522 may result in higher grayscale values in FIG. 502 than corresponding regions in image 402 giving a negative difference between first feature vector 410 and second feature vector 510. Negative differences may not be dampened and may even be enhanced to accentuate the difference between feature vectors not related to natural causes. In an example, enhancing the differences may comprise simply multiplying the absolute value of any negative values in the difference vector 600 by 10 giving field 650 values of 580, 1120, 1320 and 1220 respective.

Difference vector 600 may be used to derive a match correlation between feature vector 134 and feature vector 144 to authenticate purported weapon 114. In an example, a match correlation value may be a sum of the enhanced and dampened difference values. Thus, negative differences may shift a correlation value more than positive differences of the same magnitude.

In an example, a match between first feature vector 134 and second feature vector 144 may be determined based on a magnitude of a correlation value compared to a pre-determine threshold correlation value. In other embodiments, a match may be determined by a variety of comparison processes and claimed subject matter is not limited in this regard. In an example, if a match correlation value is within a predetermined confidence threshold value range then a match between first and second feature vectors may be declared and the purported weapon 114 may be authenticated as the genuine weapon 114.

Figure 7:
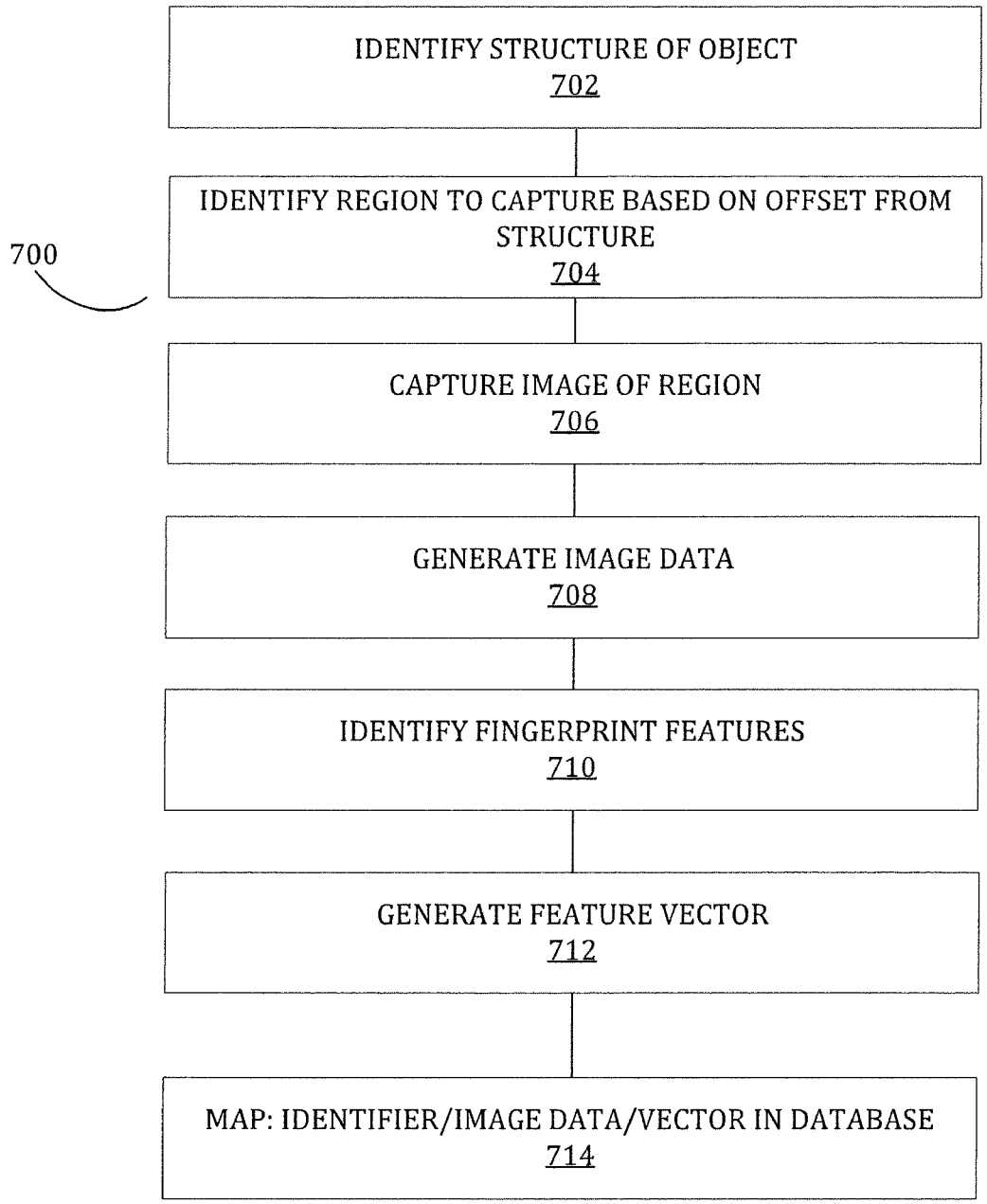
FIG. 7 depicts an example of a process for object identification and inventory management.

FIG. 7 depicts an example of a process 700 for generating a feature vector for authenticating an object. In an example, process 700 may comprise leveraging randomly-occurring physical features of an object. The features may be microscopic in scale or may be visible to the naked eye. Such features may comprise, for example, cracks in surface material, a crystalline pattern, a pattern of fibers, a bleed pattern, a pattern of fabrication irregularities and the like, or any combinations thereof. The randomly-occurring features may include fingerprint features from which values may be derived and stored in a feature vector. The feature vector may then be associated with the object.

In an example, process 700 may begin at operation 702, where a structure (see structure 124 in FIG. 1) of the object may be identified. Such a structure may comprise a variety of physical formations on a surface of the object, such as, a stamped marking, a crystalline structure, a recess, an outcropping, a component, a part, an ink deposit, a tear, an edge, and the like or combinations thereof.

At operation 704, a region of the object may be identified. In an example, the location of the region may be based on offset from the structure. The region (see region 129 in FIG. 1) may comprise fingerprint features (e.g., see fingerprint features 127 in FIG. 1). The fingerprint features may be proximate to the structure.

At operation 706, an image of the region identified on the object may be captured using a imaging system (e.g., HRI 102 or HHI 104). Such an imaging system may be, for example, a digital camera, microscope, an electron microscope, a scanner, a thermal camera, a telescope, an ultrasound imaging device, or the like, or any combinations thereof. Such an imaging system may be fixed and/or portable and claimed subject matter is not limited in this regard.

At operation 708, image data associated with the captured image may be generated.

At operation 710, image data may be processed to identify fingerprint features in the captured imaged. The fingerprint features may be identified based on proximity to the structure.

At operation 712, fingerprint features may processed to generate a feature vector.

At operation 714, map an object identifier to the image data and/or the one or more feature vectors in a database. In another embodiment, a structure and region may also be mapped to the object in the database.

Figure 8:
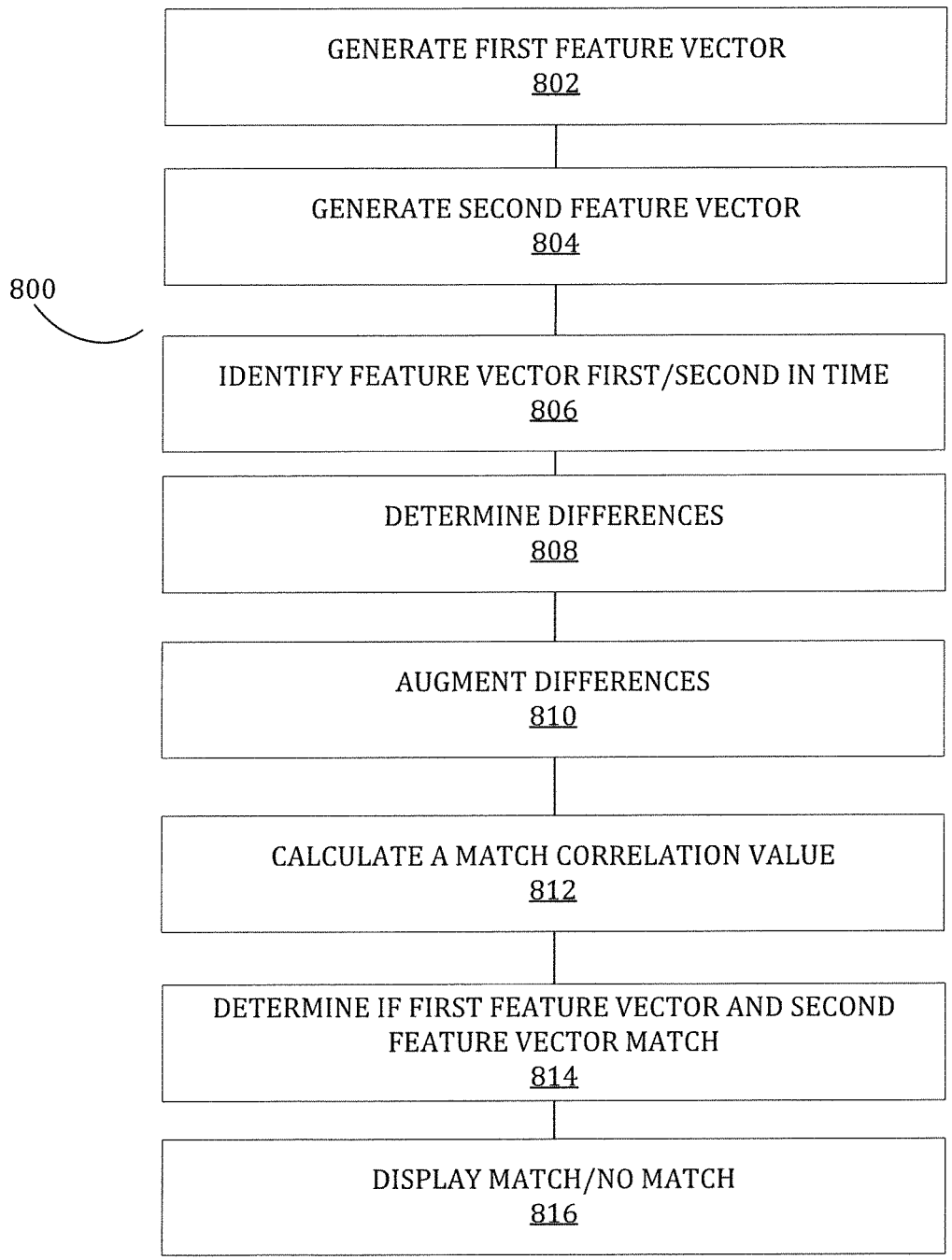
FIG. 8 depicts an example of a process for object identification and inventory management.

FIG. 8 depicts an example of an authentication process 800 for identifying and verifying an identity an object. In an example, authentication process 800 may comprise comparing a first feature vector and a second feature vector generated according to process 700 described above. The first feature vector may be generated at a first time and the second feature vector may be generated at a later second time. An asymmetrical comparison model may be executed to compare the two feature vectors to compensate for changes to the object that are likely to have been sustained due to normal wear and tear. Thus, such changes may not substantially degrade a match if it can be determined that the change is due to normal wear. Such a feature recognition system may reduce a likelihood of a false negative match. Such a feature recognition system may be configured to determine which feature vector was derived from a later in time image in order to properly dampen the effects of normal wear and tear on the object.

In an example, authentication process 800 may begin at operation 802, where a first feature vector may be generated from an image of a selected region of an object including random features comprising at least one fingerprint feature suitable for extracting a feature vector. The random features may be proximate a distinguishable structure of the object. The first feature vector may be stored in a database associated with an object identifier.

At operation 804, a second feature vector may be generated from a second image of the selected region. Importantly, exactly what the feature set from which the feature vectors are derived is not relevant so long as there is sufficient information in the resulting feature vector to tell how similar or dissimilar the original images were. Any feature set will do provided it meets that criterion.

At operation 806, the first feature vector may be accessed from the database and identified as first in time. The second feature vector may be identified as second in time. In one embodiment, a date and/or time stamp may be accessed to determine which feature vector was taken first in time.

At operation 808, compare the feature vectors to determine differences between the first feature vector and the second feature vector.

At operation 810, augment (or modify) differences between the feature vectors. In one embodiment, only differences that exceed a threshold value may be augmented. In an example, augmenting (or modifying) comprises dampening or reducing differences between first feature vector and second feature vector determined and/or likely to be caused by normal wear and tear or as a result of decay and/or other natural and unintentional causes. In an example, augmenting comprises enhancing or increasing differences between first feature vector and second feature vector determined and/or not likely to be caused by normal wear and tear or as a result of decay and/or other natural and unintentional causes. Operation 810 may include either dampening or enhancing differences between vectors or may include both dampening and enhancing differences between vectors.

At operation 812, calculate a match correlation value. In one embodiment, a match correlation value may be a sum of all of the difference values in the difference vector. In another embodiment, a match correlation value may be a sum of selected values exceeding a threshold value. There may be a variety of other ways to calculate a match correlation value and claimed subject matter is not limited in this regard.

At operation 814, a determination may be made whether first feature vector and second feature vector match. In an example, a match may be identified based on a predetermined threshold difference tolerance.

An indication that the objects match or do not match may be displayed in operation 816.

Many modifications and other embodiments of the disclosed technology will come to mind to those skilled in the art to which this disclosed technology pertains having the benefit of the teachings presented in the foregoing descriptions and the associated drawings. Therefore, it is to be understood that the disclosed technology is not to be limited to the specific embodiments disclosed and that modifications and other embodiments are intended to be included within the scope of the appended claims. Although specific terms are employed herein, there are used in a generic and descriptive sense only and not for purposes of limitation. It will be obvious to those having skill in the art that many changes may be made to the details of the above-described embodiments without departing from the underlying principles of the disclosed technology. The scope of the present disclosed technology should, therefore, be determined only by the following claims.

The invention claimed is:

1. A machine-implemented method comprising:
recognizing a structural feature of an object;
selecting a region of the object based on the structural feature;
provisioning a database coupled to a network for communications;
capturing a first image of the selected region so as to form first image data, wherein the first image has sufficient resolution to show at least one fingerprint feature;
processing the first image data to extract a first feature vector expressing the fingerprint feature, wherein the first feature vector comprises a first set of numeric values, each of the numeric values responsive to light intensity in a corresponding sub-region of the first image; and
storing the first feature vector in the database in association with a unique identifier associated with the object;
after said storing, performing a process with respect to an article, the process comprising:
selecting a region of an article, the selected region of the article corresponding to the selected region of the object;
capturing a second image of the selected region of the article, so as to form second image data, wherein the second image has substantially the same resolution as the first image;
processing the second image data to extract a second feature vector, wherein the second feature vector comprises a second set of numeric values, the second set of numeric values responsive to the same respective sub-regions of the second image as the first set of numeric values are to the first image;
querying the database using the identifier of the object as an index to access the first feature vector;
comparing the second feature vector to the stored first feature vector, by comparing the first set of numeric values to the second set of numeric values to determine difference values;
responsive to the comparison, augmenting or modifying a difference between the first and second feature vectors, the augmenting or modifying comprising at least one of reducing at least one of said difference values or increasing at least one of said difference values;
calculating a match correlation value responsive to the augmenting or modifying; and
identifying a match between the object and the article in the case that the match correlation value exceeds a predetermined threshold.

2. The method of claim 1 further comprising calculating the match correlation value asymmetrically, including:
determining whether the first feature vector indicates a feature that is absent from the second feature vector; and
enhancing the match correlation based on a result of the determination.

3. The method of claim 1 further comprising calculating the match correlation value asymmetrically, including:
determining whether the second feature vector indicates a feature that is absent from the first feature vector; and
dampening match correlation based on a result of the determination.

4. The method of claim 1 further comprising reporting a match in the case that the match correlation value exceeds the predetermined threshold.

5. The method of claim 1 further comprising dampening the match correlation value by eliminating ones of the difference values that are below a threshold value.

6. The method of claim 1 further comprising dampening the match correlation value by reducing ones of the difference values that are below a threshold value.

7. The method of claim 1 wherein increasing at least one of the difference values further comprises increasing ones of the difference values that are above a threshold value.

8. The method of claim 1 wherein the fingerprint feature comprises at least one of: cracks or other non-uniformities in surface material, a crystalline pattern, a pattern of fibers, a bleed pattern, a pattern of fabrication irregularities.

9. The method of claim 1 wherein extracting the first feature vector includes selecting an average grayscale level in each sub-region of the first image as the corresponding numeric value for that sub-region, and selecting an average grayscale value in each sub-region of the second image as the corresponding numeric value for that sub-region.

10. The method of claim 9 wherein the comparing step includes calculating a sum of the squares of the difference values, and then comparing the sums of squares.

11. The method of claim 1 wherein augmenting or modifying includes, only in the case that a square of an individual difference in corresponding numeric values is below a predetermined threshold value, reducing a corresponding one of the difference values before calculating the sum of the squares of the difference values, thereby dampening the difference.

12. The method of claim 1 including storing the location of the selected region in the database and maintaining the location as confidential.

13. The method of claim 1 wherein the object is one of a weapon, a document, a coin, a gemstone, an animal, and an art work.

14. A machine-implemented method comprising:
capturing a first digital image of a first selected region of an object, wherein the first digital image has sufficient resolution to show an area in the first selected region comprising a first pattern of features;
processing the first digital image to generate a first feature vector comprising data corresponding to the first pattern of features of the object; and
storing the first feature vector and the first digital image in a database in association with an object identifier;
after said storing, performing a process with respect to an article, the process comprising:
selecting a second selected region of the article, the second selected region of the article corresponding to the first selected region of the object;
capturing a second digital image of the second selected region of the article, wherein the second digital image has sufficient resolution to show an area comprising a second pattern of features;
processing the second digital image to generate a second feature vector comprising data corresponding to the second pattern of features of the article;
comparing the first feature vector with the second feature vector to determine difference values;
responsive to the comparison, augmenting or modifying a difference between the first and second feature vectors, the augmenting or modifying comprising at least one of reducing at least one of said difference values or increasing at least one of said difference values;
determining a match confidence that the data corresponding to the second pattern of features matches the data corresponding to the first pattern of features responsive to the augmenting or modifying;
comparing the match confidence to a predetermined threshold; and
in the case that the match confidence exceeds the predetermined threshold, indicating that the article is the object.

15. The method of claim 14 wherein the first pattern of features is a natural product of manufacture of the object or manufacture of a material or piece incorporated into the object.

16. The method of claim 15 wherein the first pattern of features comprises metal crystal structure defects or variations, the data of the first feature vector indicating a location of at least one defect or variation in a crystalline structure of a metal region recorded in the digital image.

17. The method of claim 15 wherein the first pattern of features comprises metal machining or milling marks presumably resulting from manufacture of a material or piece incorporated into the object.

18. A system, comprising:
one or more processors configured to:
capture a digital image of a region of an item, the region including an identifiable structure;
extract data representing at least one fingerprint feature from the digital image of the region of the item; and
store fingerprint feature data in a first feature vector in memory;
after said storing, select a region of an article, wherein the selected region of the article corresponds to the region of the item;
capture a digital image of the selected region of the article;
process digital image data of the digital image of the selected region of the article to extract a second feature vector;
compare the feature vectors to determine difference values and determine whether to augment or modify a difference between the first and second feature vectors;
in response to determining to augment or modify the difference between the first and second feature values, reduce at least one of said difference values or increase at least one of said difference values to generate a first match correlation value; and
in response to determining to not augment or modify the difference between the first and second feature values, generate a second match correlation value that is different than the first match correlation value.

19. The system of claim 18 wherein the digital image of the region of the item is a high-resolution color image, detailed enough to show elements of a grain surface of inter- and intra-character regions proximate to the identifiable structure.

20. The system of claim 19 wherein the item is a weapon and the identifiable structure is an alphanumeric identifier.

21. The system of claim 20 wherein the weapon is a handgun, rifle or shotgun.

22. The system of claim 21 wherein the one or more processors are further configured to transmit the encrypted digital image and the encrypted fingerprint data and the alphanumeric identifier of the item to an inventory control system in association with one another.

23. The system of claim 20 wherein the fingerprint feature is a natural product of manufacture of the weapon or manufacture of a material or piece incorporated into the weapon.

24. The system of claim 23 wherein the fingerprint feature comprises metal crystal structure defects or variations, the fingerprint feature data indicating a location of at least one defect or variation in a crystalline structure of a metal region.

25. The system of claim 18 wherein the digital image of the region of the item is detailed enough to reveal variations, imperfections and/or flaws in the individual characters within an alphanumeric identifier.

26. The system of claim 18 wherein the fingerprint feature comprises metal machining or milling marks presumably resulting from manufacture of a material or piece incorporated into the weapon.

27. The system of claim 18 wherein the region of the item is selected based on a predetermined offset vector from the identifiable structure on the item and wherein the one or more processors are further configured to identify the fingerprint feature based on the offset from the identifiable feature, and store data identifying the region in a fingerprint database in association with an alphanumeric identifier of the item.

28. The system of claim 18 wherein the one or more processors are further configured to encrypt the data identifying said region where the fingerprint feature is located.

\* \* \* \* \*